(12) United States Patent
Ko et al.

(10) Patent No.: US 9,918,024 B2
(45) Date of Patent: Mar. 13, 2018

(54) MULTI FUNCTIONAL CAMERA WITH BEAM SPLITTER

(71) Applicant: Google Inc., Mountain View, CA (US)

(72) Inventors: Jamyuen Ko, San Jose, CA (US); Chung Chun Wan, Fremont, CA (US)

(73) Assignee: Google LLC, Mountain View, CA (US)

( * ) Notice: Subject to any disclaimer, the term of this patent is extended or adjusted under 35 U.S.C. 154(b) by 319 days.

(21) Appl. No.: 14/720,460

(22) Filed: May 22, 2015

(65) Prior Publication Data

US 2016/0344951 A1  Nov. 24, 2016

(51) Int. Cl.
| | |
|---|---|
| *H04N 5/33* | (2006.01) |
| *G01S 17/02* | (2006.01) |
| *G01S 17/89* | (2006.01) |
| *G01S 7/481* | (2006.01) |
| *H04N 13/02* | (2006.01) |

(52) U.S. Cl.
CPC ............. *H04N 5/33* (2013.01); *G01S 7/4813* (2013.01); *G01S 7/4816* (2013.01); *G01S 17/023* (2013.01); *G01S 17/89* (2013.01); *H04N 13/0253* (2013.01); *H04N 13/0285* (2013.01)

(58) Field of Classification Search
CPC .. H04N 5/33; H04N 13/0253; H04N 13/0285; H04N 5/332; H04N 3/09; G01S 17/023; G01S 17/89; G01S 7/4816; G01S 7/4813; G01J 5/02; G01J 2005/0077
See application file for complete search history.

(56) References Cited

U.S. PATENT DOCUMENTS

| | | | | |
|---|---|---|---|---|
| 7,667,762 B2 * | 2/2010 | Jenkins | ................... | H04N 9/045 348/263 |
| 8,320,047 B2 * | 11/2012 | Tocci | ...................... | G02B 5/04 359/629 |
| 2007/0115376 A1 * | 5/2007 | Igarashi | ................... | H04N 9/09 348/262 |
| 2010/0103305 A1 * | 4/2010 | Suda | ...................... | G03B 13/06 348/333.02 |
| 2011/0211073 A1 * | 9/2011 | Foster | .................... | H04N 5/232 348/164 |
| 2012/0105594 A1 * | 5/2012 | You | ........................ | G01S 7/4811 348/49 |
| 2012/0314039 A1 * | 12/2012 | You | ..................... | H04N 5/23209 348/49 |
| 2013/0215235 A1 * | 8/2013 | Russell | ............. | H04N 13/0203 348/47 |
| 2014/0055565 A1 * | 2/2014 | You | ..................... | H04N 13/0207 348/46 |
| 2014/0063332 A1 * | 3/2014 | Miyawaki | ............ | H04N 5/2254 348/360 |
| 2015/0358560 A1 * | 12/2015 | Boulanger | ............. | H04N 5/332 348/164 |
| 2016/0070125 A1 * | 3/2016 | Reich | ....................... | G02F 1/132 348/164 |

FOREIGN PATENT DOCUMENTS

| | | |
|---|---|---|
| CN | 2849755 Y | 12/2006 |
| WO | WO-2011149576 | 12/2011 |

* cited by examiner

*Primary Examiner* — Sathyanaraya V Perungavoor
*Assistant Examiner* — Howard D Brown, Jr.
(74) *Attorney, Agent, or Firm* — Fish & Richardson P.C.

(57) ABSTRACT

An apparatus is described that includes a camera. The camera has a beam splitter to impose different optical paths for visible light and infra red light received by the camera. The camera has an infra red light detector to detect the infra red light and a visible light detector to detect the visible light.

21 Claims, 11 Drawing Sheets

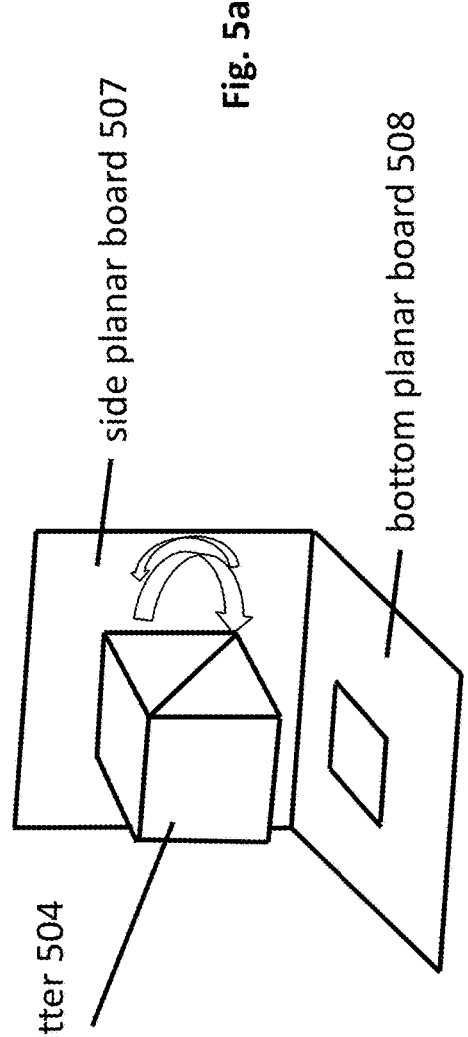
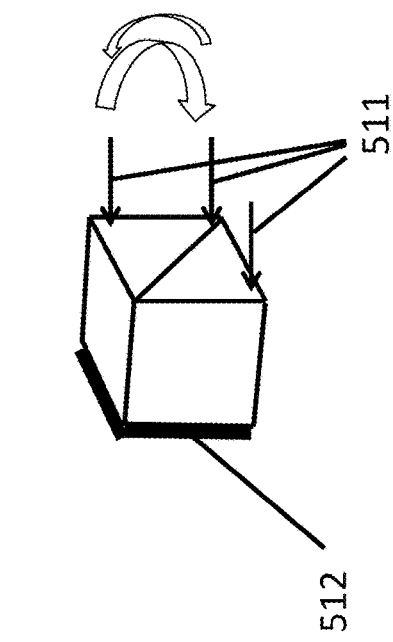
Fig. 5a
Fig. 5b

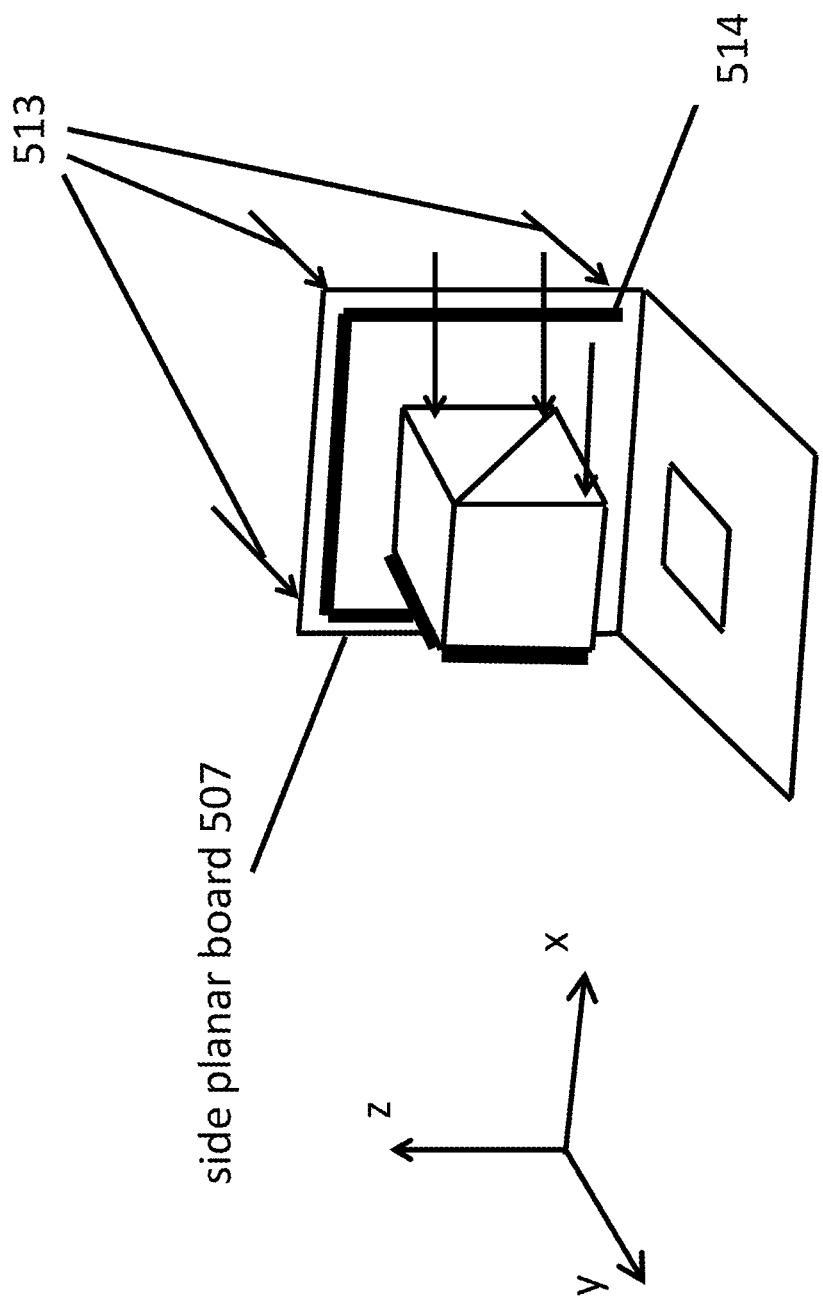

US 9,918,024 B2

MULTI FUNCTIONAL CAMERA WITH BEAM SPLITTER

FIELD OF INVENTION

The field of invention pertains to imaging and camera system generally; and, more specifically, to a multi-functional camera with a beam splitter.

BACKGROUND

Many existing computing systems include a traditional camera as an integrated peripheral device. A current trend is to enhance computing system imaging capability by integrating depth capturing into its imaging components. Depth capturing may be used, for example, to perform various intelligent object recognition functions such as facial recognition (e.g., for secure system un-lock) or hand gesture recognition (e.g., for touchless user interface functions).

Figure 1:
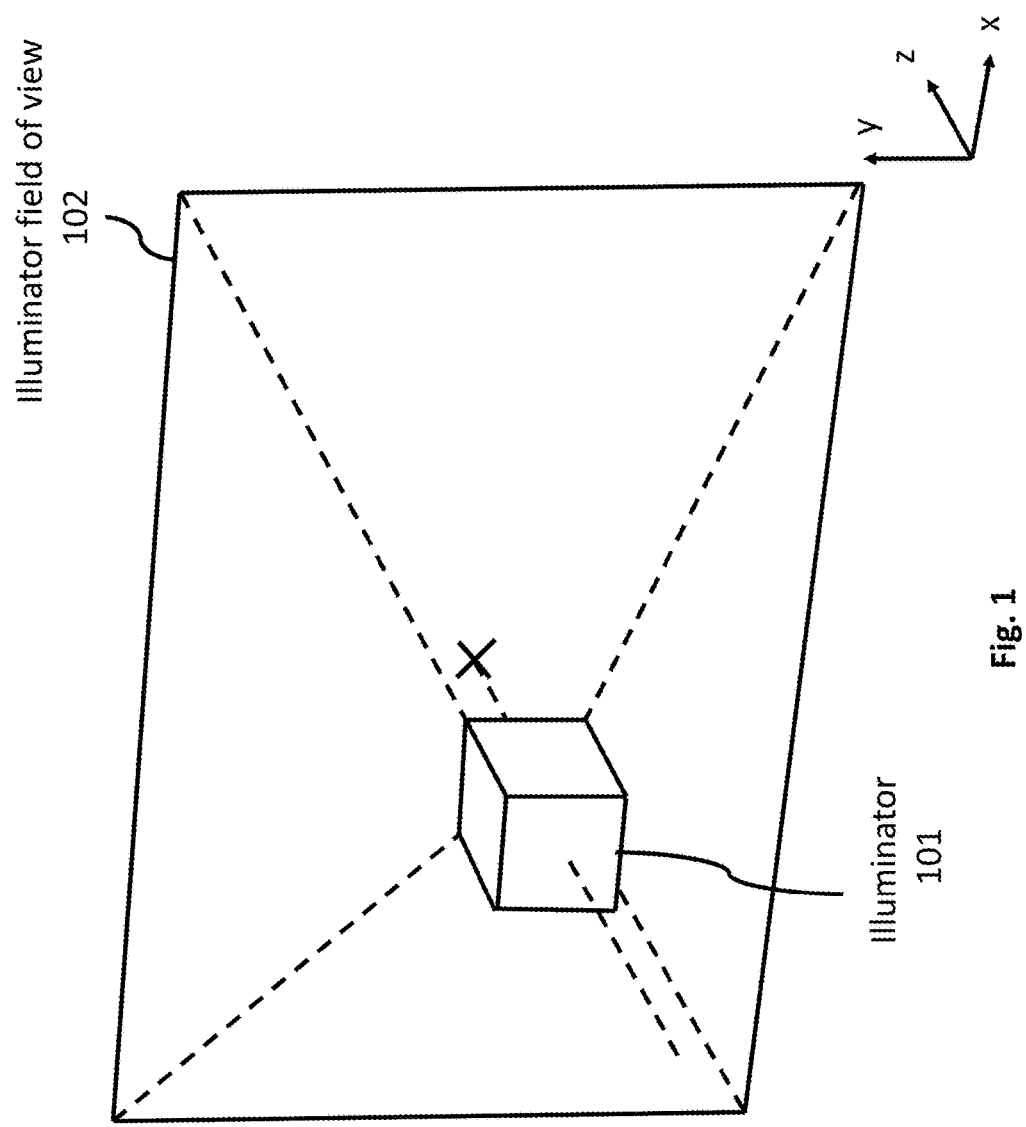

FIG. 1 shows a camera having an illuminator 101 that has the ability to shine light within a field of view 102. One depth information capturing approach, referred to as "time-of-flight" imaging, emits light from the illuminator onto an object and measures, for each of multiple pixels of an image sensor, the time between the emission of the light and the reception of its reflected image upon the sensor. The image produced by the time of flight pixels corresponds to a three-dimensional profile of the object as characterized by a unique depth measurement (z) at each of the different (x,y) pixel locations.

As many computing systems with imaging capability are mobile in nature (e.g., laptop computers, tablet computers, smartphones, etc.), the integration of a light source ("illuminator") into the system to achieve "time-of-flight" operation presents a number of design challenges such as cost challenges, packaging challenges and/or power consumption challenges.

SUMMARY

An apparatus is described that includes a camera. The camera has a beam splitter to impose different optical paths for visible light and infra red light received by the camera. The camera has an infra red light detector to detect the infra red light and a visible light detector to detect the visible light.

An apparatus is described that includes first means for receiving visible light. The apparatus also includes second means for directing the visible light through a beam splitter and then through a first optical path to a visible light sensor. The apparatus also includes third means for performing visible image processing from signals generated by the visible light. The method also includes fourth means for receiving infra red light. The method also includes fifth means for directing the infra red light through the beam splitter and then through a second optical path to an infra red light sensor. The method also includes sixth mean for performing time-of-flight depth profiling from signals generated by the infra red light.

FIGURES

Figure 2:
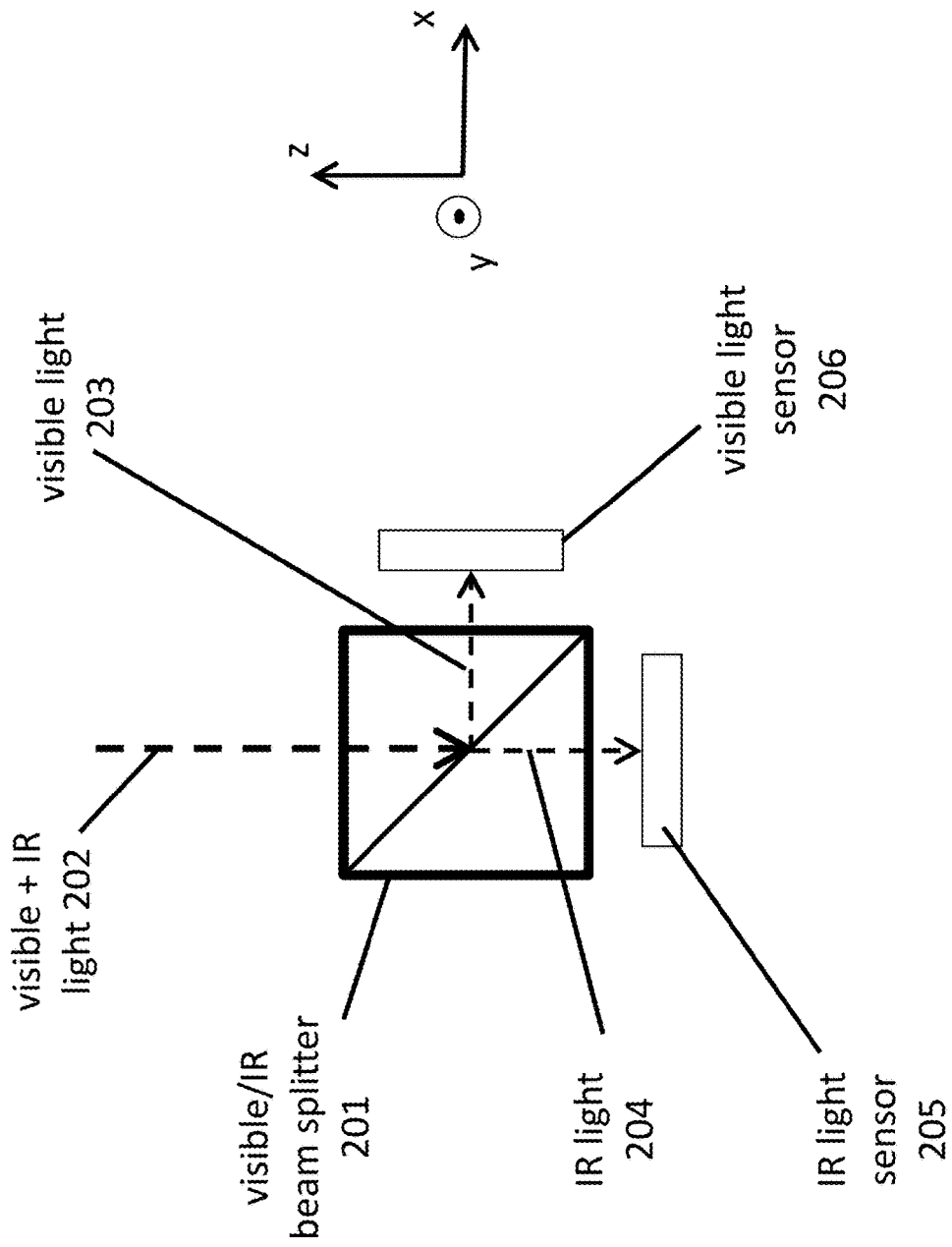
Figure 3:
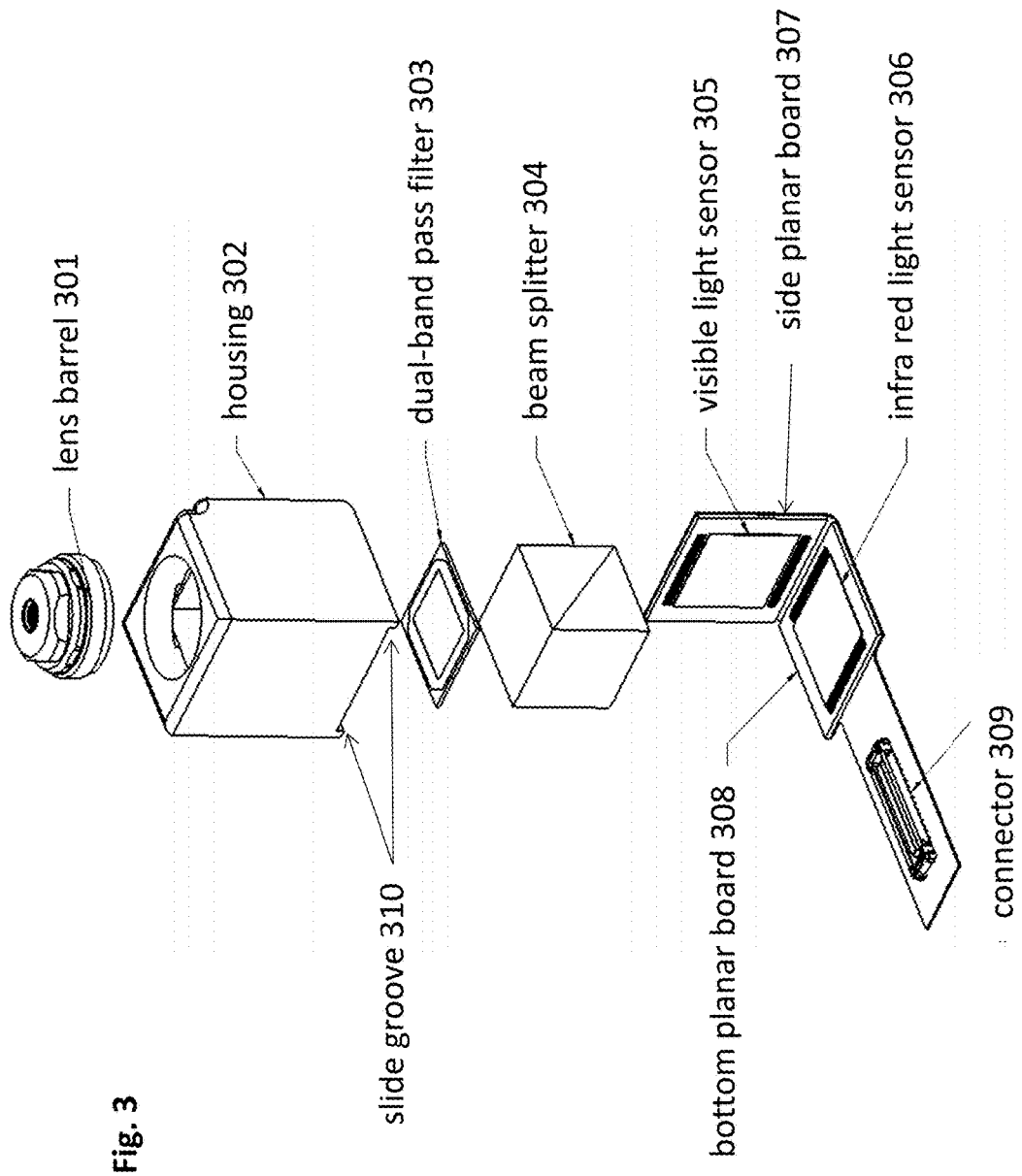
Figure 4:
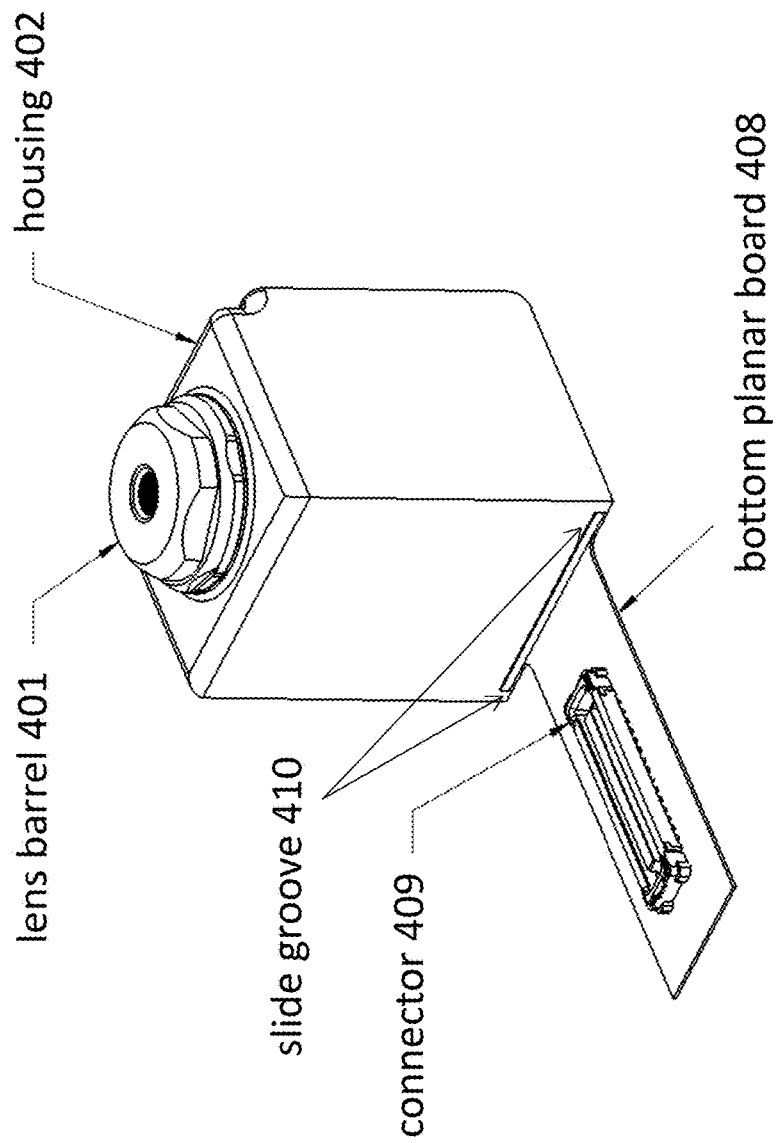
Figure 6:
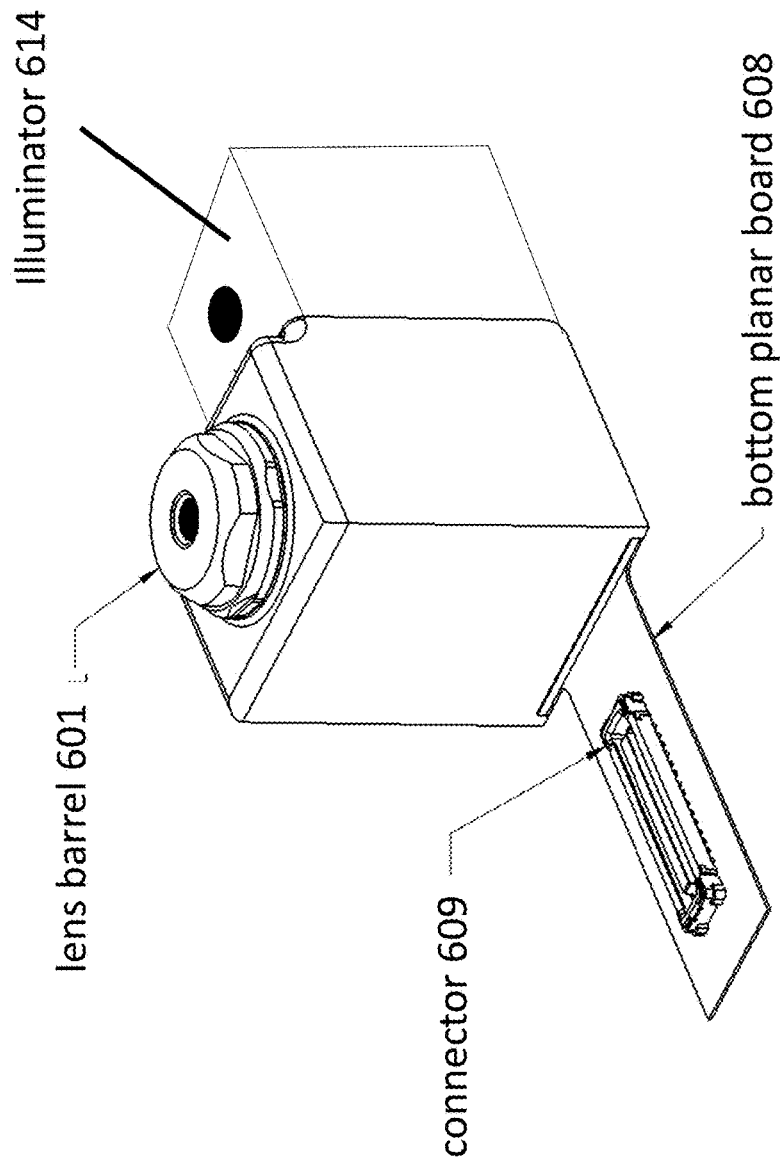
Figure 7A:
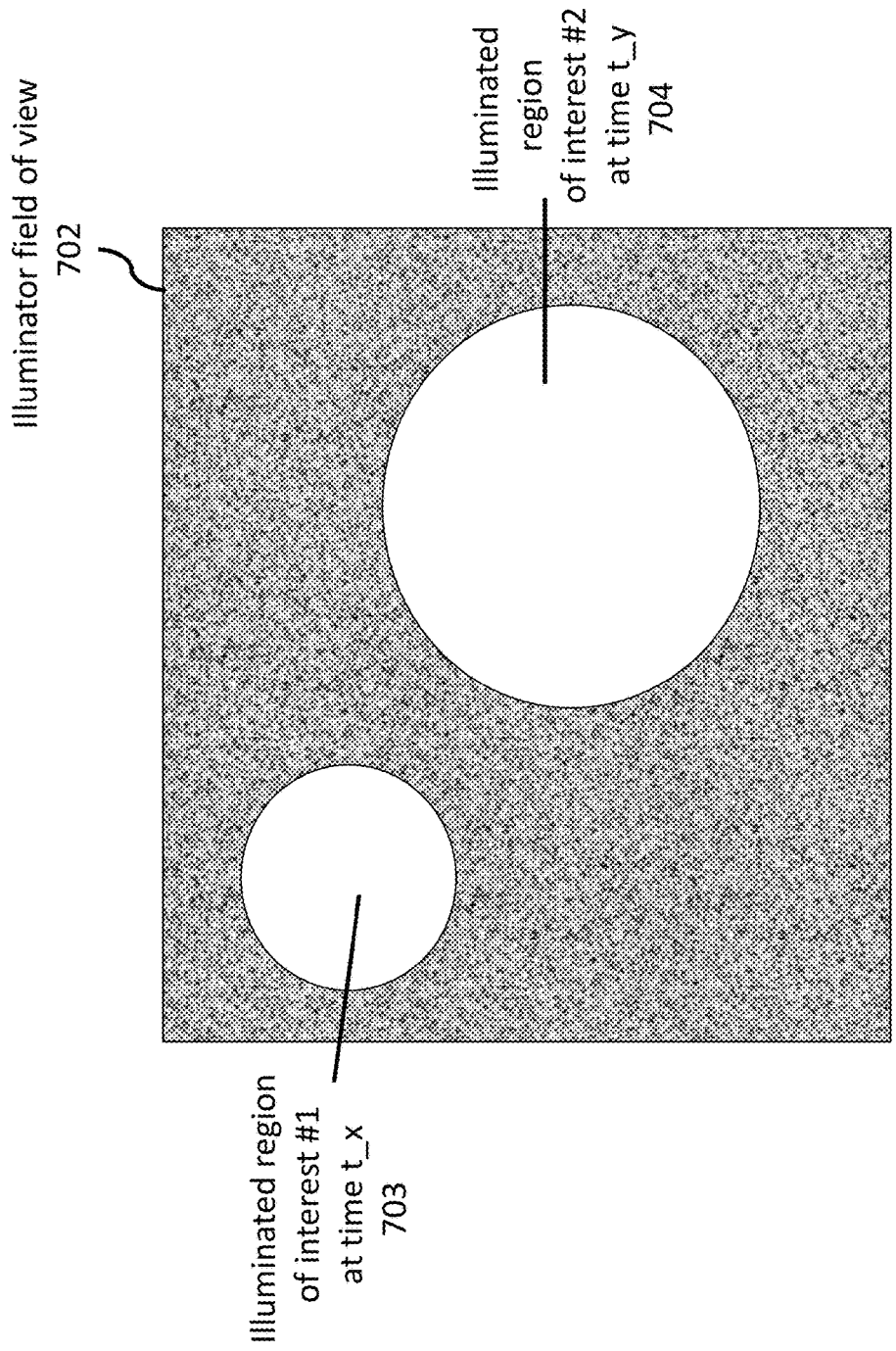
Figure 7B:
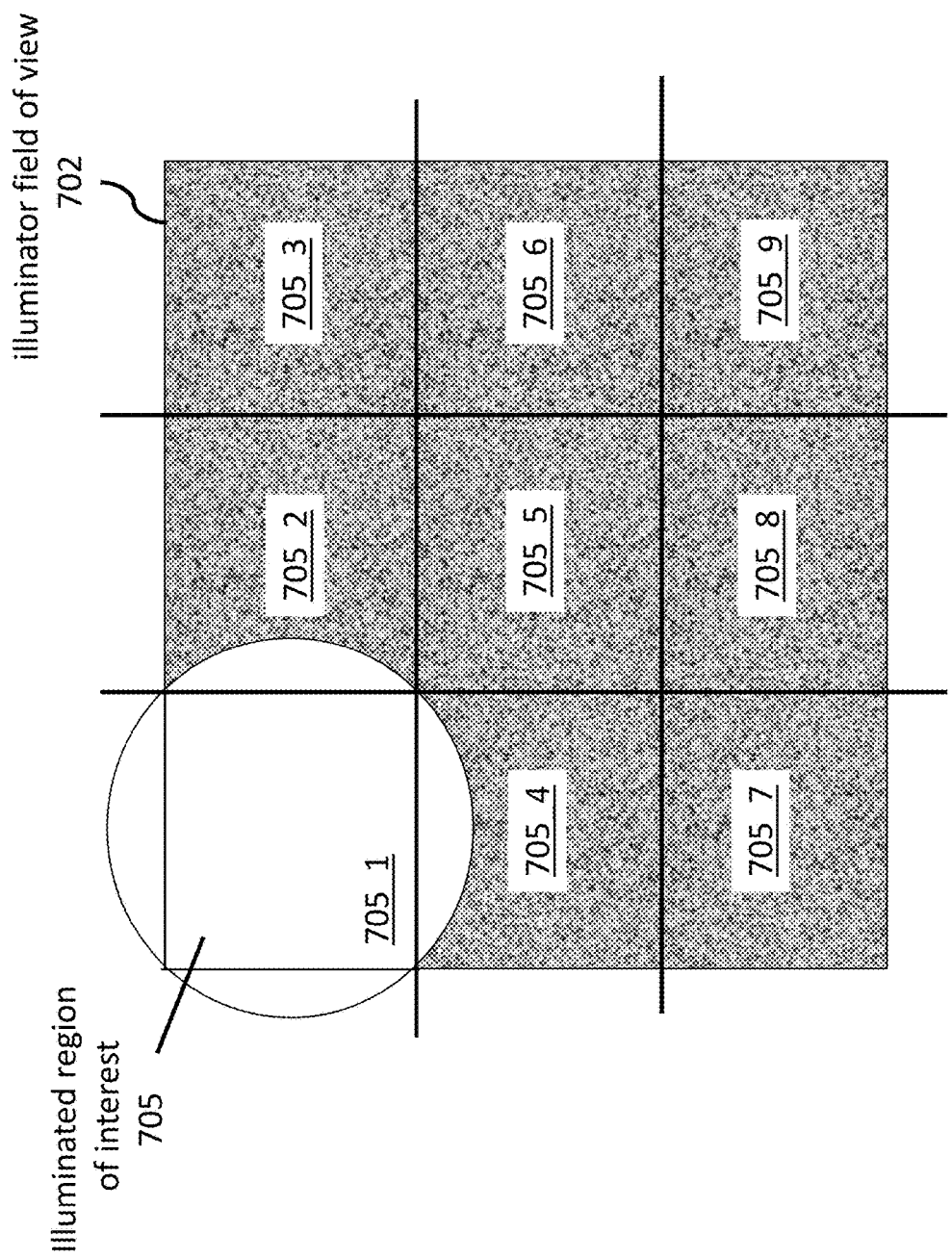
Figure 8:
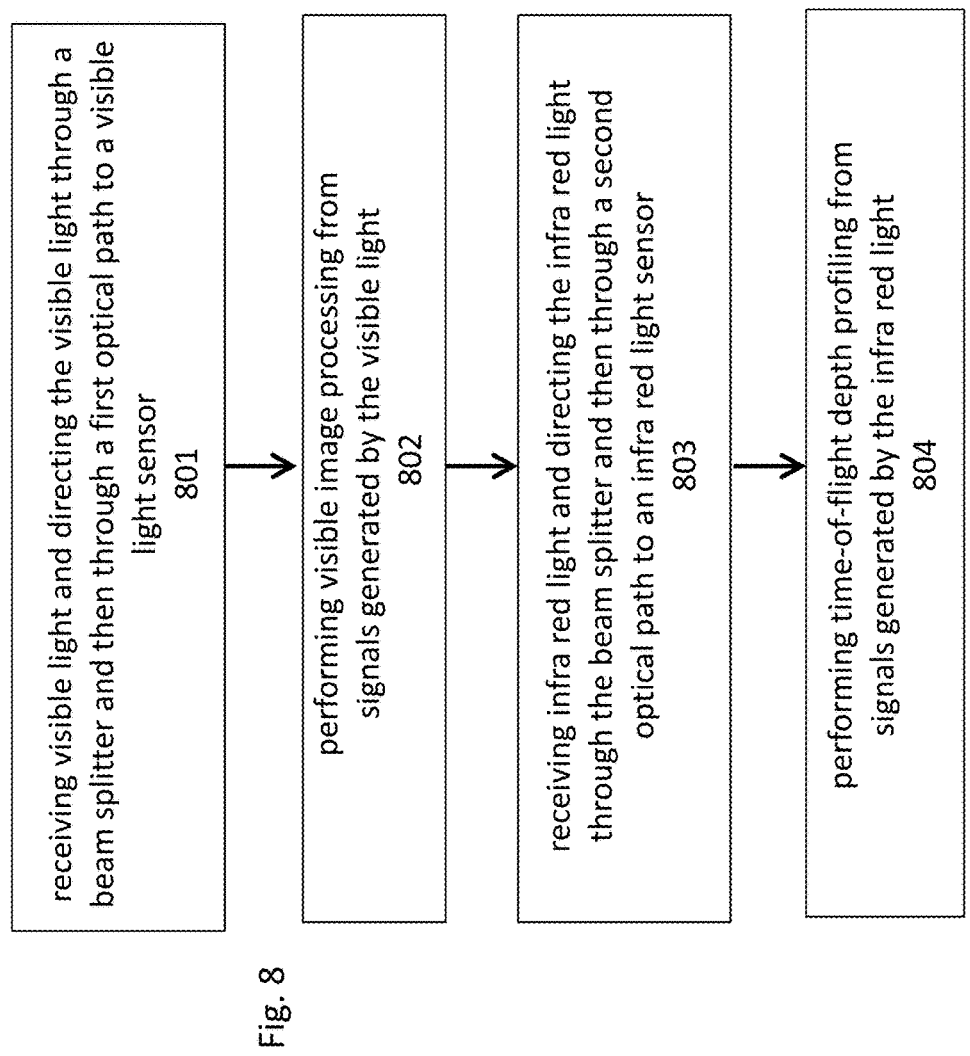
Figure 9:
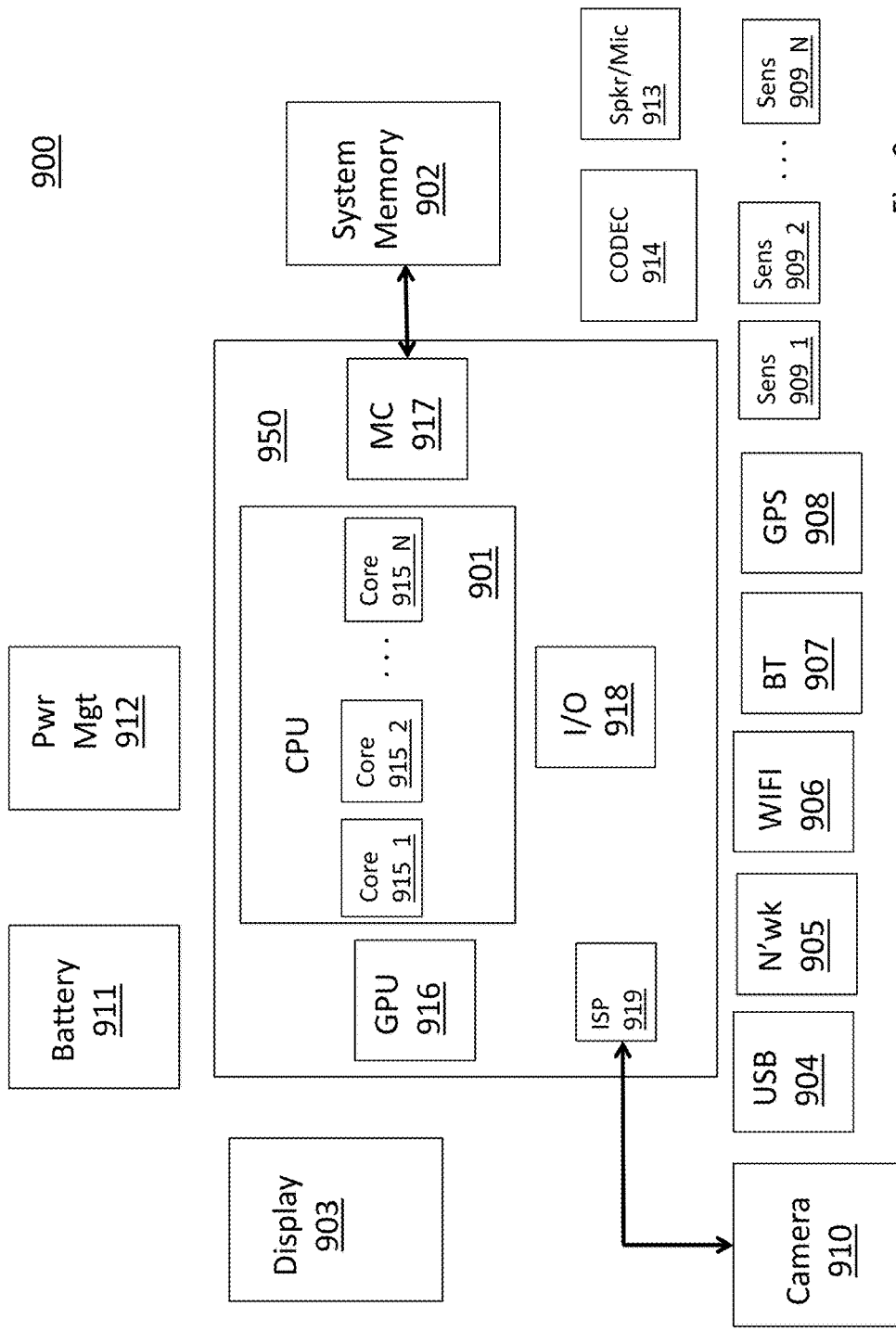

The following description and accompanying drawings are used to illustrate embodiments of the invention. In the drawings:

FIG. 1 shows a camera having an illuminator;
FIG. 2 shows an optical receiver design for a camera;

FIG. 3 shows a more detailed exploded view of an embodiment of the optical receiver design of FIG. 2;
FIG. 4 shows an embodiment of a completed assembly of the optical receiver design of FIG. 3;
FIGS. 5a through 5c pertain to a mechanical design for adjusting the optical paths of the optical receiver design of FIG. 2;
FIG. 6 shows an embodiment of a complete camera having an optical receiver design and an illuminator;
FIGS. 7a and 7b pertain to different embodiments for achieving smart illumination;
FIG. 8 shows a method performed by a camera as described herein;
FIG. 9 shows an embodiment of a computing system.

DETAILED DESCRIPTION

Various implementations may desire to include some other form of image capture along with time of flight image capture. For example, some camera implementations may choose to integrate traditional image capture along with time-of-flight depth profiling. That is, for example, in one mode of operation the camera may operate as a traditional camera that takes pictures of visible light images, yet, in another mode of operation, the camera may perform time-of-flight depth profiling of an image in front of the camera.

A design approach for a multi-functional camera such as the camera described above is to assign a different wavelength for the different modes of operation. For example, the visible light image capture function would be responsive to light within the visible light spectrum while the time-of-flight image capture function would be responsive to light within the infra-red light spectrum.

A camera designed according to the above described design philosophy could also conceivably include a third mode in which an infra-red image is captured. Here, according to one approach, the camera would emit infra-red light to permit time-of-flight capture but would simply react to ambient infra-red light to perform standard infra-red imaging.

A pertinent part of the design of a camera that assigns different wavelengths to different functions is an optical receiver that can correctly detect the different wavelengths and direct electrical signals from either wavelength to a specific electrical channel that is designed to support a particular mode. For instance, using the above described camera as an example, the optical receiver should be able to direct visible light to an electrical channel that processes visible images, and, direct infra-red light to an electrical channel that performs time of flight measurements and/or processes infra-red images.

FIG. 2 shows an exemplary design for such an optical receiver. As observed in FIG. 2, both visible and infra-red (IR) light 202 can be received at the input of the optical receiver. An optical beam splitter 201 then directs light of different wavelengths into different directions. In the particular embodiment of FIG. 2, incident infra-red light 204 is permitted to continue to progress "straight through" the beam splitter 201 toward an infra-red image sensor 205, while, incident visible light 203 is reflected in a direction that is perpendicular to its original incident direction toward a visible light sensor 206. In alternate embodiments the beam splitter may be designed to pass visible light and reflect infra-red light.

The visible light sensor 206 is coupled to electronic circuitry (not shown) that processes visible images. The infra-red light sensor 205 is coupled to electronic circuitry (not shown) that processes infra-red images. In various embodiments, both sensors 205, 206 are pixelated. That is, for example, in an embodiment the visible light sensor is an RGB image sensor 206 that is pixelated into (e.g., an array of) different regions each individually sensitive to red (R), green (G) or blue (B) wavelengths within the visible spectra.

Likewise, the infra-red image sensor 205 may be pixelated into (e.g., an array of) different regions that are each sensitive to infra-red light. With each pixel generating a signal that is proportional to the intensity of the light received at its particular region, an overall image that exists in front of the camera can be digitally realized. Both sensors 305, 306 may be implemented as image sensors having circuitry to stream images captured by their associated pixel arrays. In extended embodiments the image sensors may also include various image signal processing circuitry as well.

FIG. 3 shows an exploded view of the optical receiver portion of a camera having the optical design discussed above. A housing 302 is used to keep in place a lens barrel 301, a dual band pass filter 303, the beam splitter 304, the infra red sensor 306 and the visible light sensor 305 to keep in place the overall desired optical design.

The lens barrel 301 is affixed to the top of the housing 302. The dual-band pass filter 303 substantially passes both infra red light and visible light but substantially blocks light at other wavelengths. The infra red light sensor 306 is affixed to the bottom of the housing 302, the visible light sensor 305 is affixed to a side of the housing 302. The positions of the dual band pass filter 303 and beam splitter 304 are fixed relative to one another, the lens barrel 301 and the light sensors 305, 306 by the housing.

The light sensors 305, 306 are mechanically and electrically coupled to planar boards 307, 308. The infra-red light sensor 306 is coupled to a bottom or base planar board 308 that includes other electrical components (e.g., semiconductor chips (not shown)) of the camera, and, a connector 309 for connecting the camera to, e.g., a motherboard of a larger computing system such as a personal computer or handheld computing system. The planar board 307 that the visible light sensor 305 is coupled to is itself coupled to the base planar board 308 with, e.g., a flex cable. Alternatively, the planar board 308 may plug into a connector 309 that is mounted on the base planar board 308.

FIG. 4 shows the completed assembly. Note that the housing 402 has a slide groove 310, 410 into which the portion of the bottom planar board 408 having the infra red image sensor is inserted into to securely hold it in place within the housing 302, 402. In an embodiment, the bottom of the side of the housing having the visible light sensor has a similar notch into which the planar board having the visible light sensor slides to hold it in place.

FIGS. 5a through 5c pertain to additional housing features that may be used to make modest adjustments to the positioning of the beam splitter 504 within the housing to improve any internal optical misalignment that may be present in the receiver after the housing and all its components are fully assembled (e.g., warpage of the housing and/or one or more of the planar boards).

FIG. 5a shows an embodiment of a motivation to orient a side surface of the beam splitter 504 within the housing. Here, if the angle of orientation of any surface of the beam splitter 504 can be adjusted, all surfaces of the beam splitter will be adjusted relative to its own plane. Thus FIG. 5a depicts the operation of a design in which an adjustment can be applied to the right yz face of the beam splitter 504.

FIG. 5b shows a mechanical design for implementing the movement suggested by FIG. 5a. As observed in FIG. 5b, three positional set points 511 are applied to three different locations of the right yz face of the beam splitter. Each set point can be set to a different distance into the −x direction to effectively define any surface orientation of the right yz face of the cube.

The set points can be implemented, for example, with three different screws that thread through three corresponding holes in the right yz face of the housing. By individually threading each screw to a specific amount, the distance that each screw presses into the right yz face of the beam splitter is individually set, which, in turn, can set the right yz face of the beam splitter to any orientation.

On the opposite side of the beam splitter (the left yz face) there is an elastic cushion 512 of some thickness that presses against the left yz face in the +x direction. The cushion 512 and the splitter 504 can be "stuffed" into a cavity formed in the housing that surrounds and makes contact with the splitter/cushion on all sides of the beam splitter 504 except those sides that receive or emit light. The thickness of the cushion 512 within the cavity establishes the depth to which any set point can "push" into the −x direction.

FIG. 5c shows another embodiment in which some degree of orientation adjustment can also applied to the planar board 507 on the side of the housing (e.g., the planar board with the visible light image sensor). Here, three set points 513 are applied to the side planar board at individually varying degrees of depth in order to set the orientation of the side planar board, which nominally lies flush with the xz plane. In an embodiment, the side planar board 507 is conducive to some adjustment in its planar orientation because of the flex cable that couples it to the bottom planar board.

The set points 513 may be implemented with screws that individually screw into respective through holes on the side of the housing. In an embodiment there also exists elastic cushion material 514 that is inserted between the side planar board and the inner surface of the slide groove in the housing that the side planar board slides into. The planar board is tightly held in place by the slot and the cushion but some degree of adjustment is still possible because of the compressible property of the cushion.

Thus an alignment technique may include first setting the position of the beam splitter 504 to orient incident light directly upon the bottom planar board. The adjustment of the beam splitter 504 may cause some misalignment in the optical reception of the side planar board. However the orientation of the side planar board can be adjusted to reduce this misalignment.

FIG. 6 shows another embodiment of a complete camera including an illuminator 614 that emits, e.g., infra-red light for time-of-flight measurements. The illuminator 614 typically includes a light source that emits, e.g., infra red light and one or more optical lenses to direct the emitted light into the field of view.

In an embodiment, the integrated system of FIG. 6 supports three modes of operation: 1) 2D mode; 3) 3D mode; and, 3) 2D/3D mode. In the case of 2D mode, the system behaves as a traditional camera. As such, illuminator 614 is disabled and the image sensor is used to receive visible images through its visible light pixel cells. In the case of 3D mode, the system is capturing time-of-flight depth information of an object in the field of view of the illuminator 614. As such, the illuminator 614 is enabled and emitting IR light (e.g., in an on-off-on-off . . . sequence) onto the object. The IR light is reflected from the object, received through the camera lens module 1601 and sensed by the image sensor's infra-red pixels. In the case of 2D/3D mode, both the 2D and 3D modes described above are concurrently active.

In various embodiments, the illuminator may support "smart illumination". Smart illumination is the ability of an illuminator to orient or direct emitted light substantially only upon a "region of interest" within the camera's field of view (e.g., a person's hand or face). Here, an image processing and image recognition function embedded in the camera or the camera's computing system may process received images to identify a region of interest to the illuminator. The illuminator, in response, emits light on the region of interest leaving one or more other regions within the field of view that are not within the region of interest without illumination.

In order to illuminate only a region of interest, the illuminator may include movable optical components, such as a movable lens and/or a movable mirror and/or a movable light source, in order to physically scan, sweep or otherwise move a beam of light and/or change the size of the surface area that is illuminated. FIG. 7a shows an example in which the emitted light beam is shaped to illuminate a first, smaller region of interest 703 at time t_x. Some time later, the emitted light beam is shaped to illuminate a second, larger region of interest 704 at time t_y.

Another illuminator design approach includes the use of a partitioned light source. For example, the light source may be implemented with an array (or arrays) of light emitting diodes (LEDs) or vertical cavity side emitting lasers (VCSELs). When a certain region of the illuminator field of view is identified as a region of interest, the illuminator only activates array location(s) that will illuminate the region of interest. FIG. 7b shows an example in which the illuminator has partitioned its light source to be able to individually illuminate nine different regions within the camera's field of view. In the particular instance depicted in FIG. 7b, only the upper left hand corner of the field of view has been illuminated by activating a corresponding light source array location(s).

Various embodiments of illuminators may also include combinations of the above described approaches.

FIG. 8 shows a method that can be performed by a camera as described herein. The method includes receiving visible light and directing the visible light through a beam splitter and then through a first optical path to a visible light sensor 801. The method then further includes performing visible image processing from signals generated by the visible light 802. The method also includes receiving infra red light and directing the infra red light through the beam splitter and then through a second optical path to an infra red light sensor 803. The method also includes performing time-of-flight depth profiling from signals generated by the infra red light 804.

FIG. 9 shows a depiction of an exemplary computing system 900 such as a personal computing system (e.g., desktop or laptop) or a mobile or handheld computing system such as a tablet device or smartphone. As observed in FIG. 9, the basic computing system may include a central processing unit 901 (which may include, e.g., a plurality of general purpose processing cores) and a main memory controller 917 disposed on an applications processor or multi-core processor 950, system memory 902, a display 903 (e.g., touchscreen, flat-panel), a local wired point-to-point link (e.g., USB) interface 904, various network I/O functions 905 (such as an Ethernet interface and/or cellular modem subsystem), a wireless local area network (e.g., WiFi) interface 906, a wireless point-to-point link (e.g., Bluetooth) interface 907 and a Global Positioning System interface 908, various sensors 909_1 through 909_N, one or more cameras 910, a battery 911, a power management control unit 912, a speaker and microphone 913 and an audio coder/decoder 914.

An applications processor or multi-core processor 950 may include one or more general purpose processing cores 915 within its CPU 901, one or more graphical processing units 916, a main memory controller 917, an I/O control function 918 and one or more image signal processor pipelines 919. The general purpose processing cores 915 typically execute the operating system and application software of the computing system. The graphics processing units 916 typically execute graphics intensive functions to, e.g., generate graphics information that is presented on the display 903. The memory control function 917 interfaces with the system memory 902. The image signal processing pipelines 919 receive image information from the camera and process the raw image information for downstream uses. The power management control unit 912 generally controls the power consumption of the system 900.

Each of the touchscreen display 903, the communication interfaces 904-907, the GPS interface 908, the sensors 909, the camera 910, and the speaker/microphone codec 913, 914 all can be viewed as various forms of I/O (input and/or output) relative to the overall computing system including, where appropriate, an integrated peripheral device as well (e.g., the one or more cameras 910). Depending on implementation, various ones of these I/O components may be integrated on the applications processor/multi-core processor 950 or may be located off the die or outside the package of the applications processor/multi-core processor 950.

In an embodiment one or more cameras 910 includes a beam splitter that effects different optical paths for visible and non visible light so that different signal processing is achieved for visible light signals and infra-red light signals. Application software, operating system software, device driver software and/or firmware executing on a general purpose CPU core (or other functional block having an instruction execution pipeline to execute program code) of an applications processor or other processor may direct commands to and receive image data from the camera system.

In the case of commands, the commands may include entrance into or exit from any of the 2D, 3D or 2D/3D system states discussed above, and, may include information that defines a region of interest for purposes of smart illumination.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
   a camera comprising a beam splitter to impose different optical paths for visible light and infra red light received by the camera, the camera comprising:
   (i) a housing,
   (ii) an infra red light detector within the housing to detect the infra red light and
   (iii) a visible light detector within the housing to detect the visible light;
   wherein the visible light detector is fixed to a first planar board and the infra red light detector is fixed to a second planar board, and the first planar board is adjustable from a first orientation to a second orientation relative to the housing.

2. The apparatus of claim 1 wherein when the first planar board is in the first orientation, respective planes of the first and second planar boards are oriented perpendicular to one another.

3. The apparatus of claim 1 wherein the first and second planar boards are coupled by a flex cable.

4. The apparatus of claim 1 wherein one of the first and second planar boards is coupled to a mechanical component to adjust the orientation of the one planar board.

5. The apparatus of claim 1 wherein the infra red light detector is coupled to time-of-flight circuitry and the visible light detector is coupled to visible image processing circuitry.

6. The apparatus of claim 1 wherein the camera further includes a mechanical component coupled to the beam splitter to adjust the orientation of the beam splitter within the housing.

7. A computing system, comprising:
   one or more processors;
   a memory controller coupled to the one or more processors;
   a system memory coupled to the memory controller;
   a camera comprising a beam splitter to impose different optical paths for visible light and infra red light received by the camera, the camera comprising:
   (i) a housing,
   (ii) an infra red light detector within the housing to detect the infra red light, and
   (iii) a visible light detector within the housing to detect the visible light;
   wherein the visible light detector is fixed to a first planar board and the infra red light detector is fixed to a second planar board, and the first planar board is adjustable from a first orientation to a second orientation relative to the housing.

8. The computing system of claim 7 wherein when the first planar board is in the first orientation, respective planes of the first and second planar boards are oriented perpendicular to one another.

9. The computing system of claim 7 wherein the first and second planar boards are coupled by a flex cable.

10. The computing system of claim 7 wherein one of the first and second planar boards is coupled to a mechanical component to adjust the orientation of the one planar board.

11. The computing system of claim 7 wherein the infra red light detector is coupled to time-of-flight circuitry and the visible light detector is coupled to visible image processing circuitry.

12. The computing system of claim 7 wherein the camera further includes a mechanical component coupled to the beam splitter to adjust the orientation of the beam splitter within the housing.

13. A method, comprising:
    adjusting an orientation of a first planar board of a camera housing relative to a second planar board of a camera housing, wherein a visible light detector is fixed to the first planar board and an infra red light detector is fixed to the second planar board;
    receiving visible light;
    directing the visible light through a beam splitter and then through a first optical path to the visible light detector;
    performing visible image processing from signals generated by the visible light;
    receiving infra red light; and
    directing the infra red light through the beam splitter and then through a second optical path to the infra red light detector.

14. The method of claim 13 further comprising illuminating a field of view with an illuminator in a smart illumination fashion.

15. The method of claim 14 wherein the illuminating comprises moving an optical component within the illuminator.

16. The method of claim 14 wherein the illuminating comprises illuminating only a section of an array or light sources.

17. The method of claim 13 further comprising performing time-of-flight depth profiling from signals generated by the infra red light.

18. The method of claim 13 wherein directing the visible light through the beam splitter occurs before adjusting an orientation of a first planar board.

19. The method of claim 13 further comprising adjusting an orientation of the beam splitter within the housing relative to the first planar board and the second planar board.

20. The method of claim 19 wherein adjusting an orientation of the beam splitter occurs before adjusting an orientation of the first planar board.

21. The method of claim 20 wherein the first planar board is coupled with the second planar board by a flex cable while adjusting an orientation of the first planar board relative to the second planar board.

* * * * *